(12) United States Patent
Nantz et al.

(10) Patent No.: US 6,563,474 B2
(45) Date of Patent: May 13, 2003

(54) REMOTE ACCESS DEVICE HAVING MULTIPLE INDUCTIVE COIL ANTENNA

(75) Inventors: John S. Nantz, Brighton, MI (US); Qingfeng Tang, Novi, MI (US); Qing Li, Canton, MI (US); Bruce D. Conner, Ann Arbor, MI (US); Keith A. Walker, Redford, MI (US); Artem Melkumov, Southfield, MI (US); Ronald O. King, Brownstown, MI (US); Riad Ghabra, Dearborn Heights, MI (US); Matthew Honkanen, Royal Oak, MI (US); Salman Khreizat, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/050,379

(22) Filed: Oct. 24, 2001

(65) Prior Publication Data

US 2002/0080083 A1 Jun. 27, 2002

Related U.S. Application Data

(60) Provisional application No. 60/257,484, filed on Dec. 21, 2000.

(51) Int. Cl.[7] .................................................. H01Q 7/08
(52) U.S. Cl. ..................... 343/788; 343/713; 343/728; 343/742; 343/867; 340/825.69
(58) Field of Search ................................. 343/713, 728, 343/742, 787, 788, 842, 866, 867; 340/870.01, 825.69, 825.72; H01Q 7/08

(56) References Cited

U.S. PATENT DOCUMENTS

| | | | | |
|---|---|---|---|---|
| 3,719,950 A | * | 3/1973 | Bukhman et al. | 343/788 |
| 3,721,989 A | * | 3/1973 | Christensen | 343/701 |
| 3,750,180 A | * | 7/1973 | Fujimoto et al. | 343/788 |
| 4,760,394 A | * | 7/1988 | Takeuchi et al. | 340/825.54 |
| 5,047,715 A | * | 9/1991 | Morgenstern | 324/207.17 |
| 5,159,332 A | * | 10/1992 | Walton | 340/825.54 |
| 5,319,364 A | | 6/1994 | Waraksa et al. | |
| 5,486,793 A | | 1/1996 | Hill | |
| 5,561,430 A | | 10/1996 | Knebelkamp | |
| 5,568,162 A | * | 10/1996 | Samsel et al. | 343/842 |
| 5,680,077 A | | 10/1997 | Jonely et al. | |
| 5,811,885 A | | 9/1998 | Griessbach | |
| 5,920,234 A | | 7/1999 | Hill | |
| 5,923,300 A | | 7/1999 | Mejia | |
| 5,933,074 A | | 8/1999 | Settles et al. | |
| 6,043,752 A | | 3/2000 | Hisada et al. | |
| 6,061,030 A | * | 5/2000 | Flowerdew | 343/742 |
| 6,084,317 A | | 7/2000 | Wolfe et al. | |
| 6,091,343 A | | 7/2000 | Dykema et al. | |
| 6,094,131 A | | 7/2000 | Chen et al. | |
| 6,130,606 A | | 10/2000 | Flick | |
| 6,130,622 A | | 10/2000 | Hussey et al. | |
| 6,154,102 A | | 11/2000 | Weber | |

\* cited by examiner

*Primary Examiner*—Tho G. Phan
(74) *Attorney, Agent, or Firm*—Bill C. Panagos

(57) ABSTRACT

A remote access device which may comprise an antenna having a first inductor with a first axis, a second inductor with a second axis, and a third inductor with a third axis, where the first, second and third axes may be oriented substantially perpendicular to each other, respectively, such that the first inductor generates a first magnetic field associated with a first plane, the second inductor generates a second magnetic field associated with a second plane different than the first plane, and the third inductor generates a third magnetic field associated with a third plane different than the first and second planes. The remote access device preferably includes a single form for the first, second and third inductors, where the first, second and third inductors are each wound on the form.

29 Claims, 1 Drawing Sheet

REMOTE ACCESS DEVICE HAVING MULTIPLE INDUCTIVE COIL ANTENNA

CROSS-REFERENCE TO RELATED APPLICATION

This application claims the benefit of U.S. provisional application Serial No. 60/257,484, filed Dec. 21, 2000.

BACKGROUND OF THE INVENTION

1. Field of the Invention

The present invention relates generally to a remote access device having a low-frequency inductive coil antenna with multiple inductors and, more particularly, to a remote keyless entry access device located within a hand held transmitter, the device having a low-frequency inductive coil antenna with multiple inductors.

2. Background Art

It is well known in the automotive industry to provide for remote access devices, such as remote keyless entry (RKE) to a vehicle through the use of a remote hand held transmitter, which is commonly referred to as a "fob." Currently available RKE fobs may be separate units, or may be part of an ignition key head, which may additionally include a key-head transponder for use in a vehicle immobilization system. Such RKE fobs generally utilize an antenna to transmit radio frequency (RF) signals to a vehicle in order to lock or unlock vehicle doors, open or close a vehicle sliding door, unlock a vehicle trunk, activate internal and/or external vehicle lights, activate a "panic" alarm, and/or perform a variety of other functions. Remote access systems using such RKE fobs may employ on-off keying (OOK) or amplitude shift keying (ASK) modulation schemes for the RF signals.

Examples of such RKE systems are described in U.S. Pat. Nos. 6,094,131 to Chen et al., U.S. Pat. No. 5,933,074 to Settles et al., and U.S. Pat. No. 5,486,793 to Hill. In particular, U.S. Pat. No. 6,094,131 discloses a keyless lock device for a car. The device includes a master control unit installed in a car and a remote controller carried by a user. The master control unit has a processing unit connected to a centralized locking control unit of the car to lock and unlock the door of the car in response to signals received from the remote controller.

U.S. Pat. No. 5,933,074 discloses a remote control transmitter broadcasting RF signals conveying plural information components. In the preferred embodiment thereof, the remote control transmitter operates in conjunction with an RF receiver installed in a vehicle to unlock the doors of the vehicle when a unique RF signal is broadcast within a defined range. The remote control transmitter also operates in conjunction with the RF receiver in the vehicle to actuate the horn of the vehicle when the same RF signal is broadcast outside the defined range.

U.S. Pat. No. 5,486,793 discloses a balanced RF oscillator and transmitter circuit. The circuit includes a pare of balanced oscillators for generating an enhanced power radiating output signal. The circuit may be used with an automotive vehicle remote keyless entry system for remotely controlling access to a vehicle in addition to controlling other vehicular functions such as alarm system features, trunk release, etc.

A number of other types of RKE systems, as well as devices that may be used in RKE systems are also known. Examples or such systems and/or devices are disclosed in U.S. Pat. No. 5,561,430 to Knebelkamp, U.S. Pat. No. 5,680,077 to Jonely et al., U.S. Pat. No. 5,811,885 to Griessbach, U.S. Pat. No. 5,920,234 to Hill, U.S. Pat. No. 5,923,300 to Mejia, U.S. Pat. No. 6,043,752 to Hisada et al., U.S. Pat. No. 6,084,317 to Wolfe et al., U.S. Pat. No. 6,091,343 to Dykema et al., U.S. Pat. No. 6,130,622 to Hussey et al., U.S. Pat. No. 6,154,102 to Weber, and U.S. Pat. No. 6,130,606 to Flick.

The RKE systems of the types described above may be characterized as active in nature, where a switch or pushbutton must be activated by a user in order to have a desired remote access function performed, such as locking or unlocking the vehicle doors. Alternatively, RKE systems may also be passive in nature, where no such switch or pushbutton activation by a user is required in order to perform a desired remote access function.

In that regard, an example of a passive RKE system is disclosed in U.S. Pat. No. 5,319,364 to Warakas et al. The passive keyless entry system described therein includes a beacon carried by an operator designed to automatically unlock the vehicle as the operator approaches the vehicle, without the need for operation of any switch or pushbutton by the operator. Similarly, the system is further designed to automatically lock the vehicle as the operator, carrying the beacon, moves away from the vehicle. In addition to the portable beacon carried by the operator, the system includes a receiver/controller located in the vehicle and an antenna connected to the receiver/controller for receiving a radio frequency encoded transmission from the beacon for locking or unlocking the vehicle.

It is also known to provide remote access devices for use in entry gate or garage door operating systems, as well as in tire pressure monitoring systems of the types well known to those of ordinary skill in the art. For example, in a garage door operating system, a remote transmitter, which may be a separate hand-held device or integrated into a vehicle, is designed to provide remote access to a garage door actuator, such as through the transmission of a radio frequency control signal.

In tire pressure monitoring systems, small remote transmitters located in the vehicle tires provide remote access to a receiver/controller in the vehicle. The remote transmitters transmit signals indicative of tire pressure and other information to the receiver/controller, which may then display such information to a vehicle operator. Alternatively, remote transceivers may be located in the vehicle tires to provide remote access to a receiver/controller in the vehicle through tire pressure information signals transmitted to the receiver/controller as well as through communication signals received by from the receiver/controller.

Current products using remote access technology, such as within an RKE fob, use as an antenna a single inductive coil. As is readily apparent to those of ordinary skill in the art, such an antenna is inherently optimized for a single plane of magnetic field transmission and/or reception. As a result, in the case of an RKE fob, depending upon the orientation of the RKE fob and/or its distance from the vehicle, a user may experience difficulty in operating the RKE fob to successfully perform various functions, such as locking or unlocking the vehicle.

Thus, there exists a need for an improved remote access device, such as an RKE fob, having an antenna that provides for low-frequency magnetic field transmission and/or reception in more than a single plane. Such a remote access device would preferably include an inductive coil antenna having two or three inductors oriented in multiple directions, such as along X and Y axes, or X, Y and Z axes, in order to optimize magnetic field transmission and/or reception in more than a single plane. Such a remote access device would thereby provide improved operation with respect to the orientation and/or distance problems described above, such as those associated with currently available RKE fobs.

SUMMARY OF THE INVENTION

Accordingly, it is an object of the present invention to provide an improved remote access device, such as an RKE fob for use with an automotive vehicle, a remote transmitter or transceiver for use in a tire pressure monitoring system, a remote transmitter for use in a garage door operating system, or a remote transceiver for use in a vehicle immobilizer system.

According to the preferred embodiment of the present invention, a remote access device is provided comprising an antenna including a first inductor having a first axis, a second inductor having a second axis, and a third inductor having a third axis, wherein the first, second and third axes are substantially perpendicular to each other, respectively, such that the first inductor generates a first magnetic field associated with a first plane, the second inductor generates a second magnetic field associated with a second plane different than the first plane, and the third inductor generates a third magnetic field associated with a third plane different than the first and second planes. The remote access device preferably includes a single form for the first, second and third inductors, wherein the first, second and third inductors are each wound on the form.

According to another embodiment of the present invention, a remote access device is provided comprising an antenna including a first inductor having a first axis and a second inductor having a second axis, wherein the first axis is nonparallel to the second axis such that the first inductor generates a first magnetic field associated with a first plane and the second inductor generates a second magnetic field associated with a second plane different than the first plane. The remote access device of this embodiment also includes a housing for the antenna.

These and other objects, features and advantages of the present invention will be readily apparent upon consideration of the following detailed description of the invention in conjunction with the accompanying drawings.

BEST MODE FOR CARRYING OUT THE INVENTION

Referring to FIGS. 1–4, the preferred embodiment of the present invention will now be described. As previously noted, current products using remote access technology, such as within an RKE fob, use a single inductive coil antenna that is inherently optimized for a single plane of magnetic field transmission and/or reception. As a result, in the example of an RKE fob, depending upon the orientation of the RKE fob and/or its distance from the vehicle, a user may experience difficulty in operating the RKE fob to successfully perform various functions, such as locking or unlocking the vehicle.

In the preferred embodiment of the present invention, a remote access device, such as an RKE fob, is provided with an inductive coil antenna having two or three inductors oriented for optimization of the transmission and/or reception of low-frequency magnetic fields in more than one plane. As a result, in the case of an RKE fob, the present invention is less sensitive to the orientation of the RKE fob and/or its distance from the vehicle, thereby reducing difficulties that a user may experience in operating the RKE fob to successfully perform various functions, such as locking or unlocking the vehicle.

It should also be noted that the remote access device of the present invention could be used in any of the remote access systems or transmitters described above, such as active or passive keyless vehicle entry systems, where the remote access device may form part of an RKE fob or card as previously described for performing typical functions associated therewith such as locking and unlocking the vehicle. The remote access device of the present invention could also be used in the previously described vehicle immobilizer systems, where it may form part of a remote immobilizer transponder, such as is an ignition key-head.

Still further, the remote access device of the present invention could also be used in a tire pressure monitoring system of the type described above, where the remote access device may form part of a remote transmitter or transceiver located in a vehicle tire. Further still, the remote access device of the present invention could also be used in the garage door or gate operating systems previously described, where the remote access device may form part of a remote transmitter for operating a garage door or gate actuator. Indeed, as those of ordinary skill will appreciate, the remote access device of the present invention could be used in any type of remote access system or transmitter.

Figure 1:
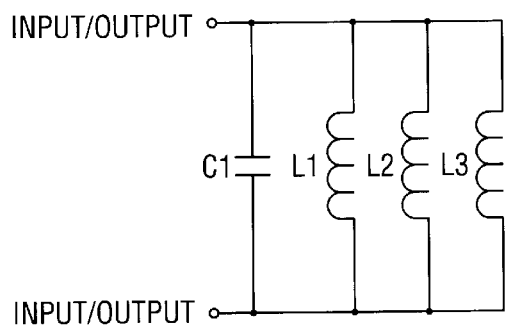
FIG. 1 is a simplified electrical schematic representation of a parallel version of the multiple inductor antenna of the remote access device of the present invention.
Figure 2:
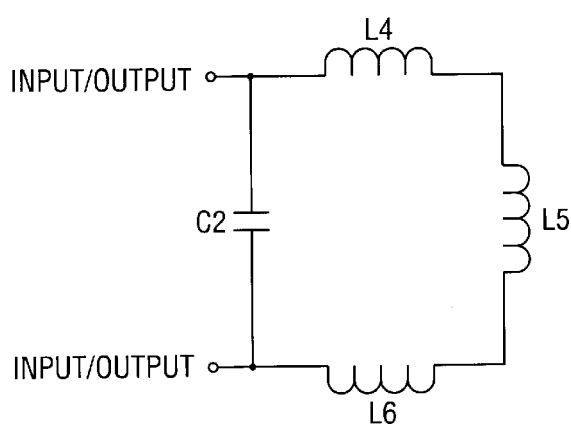
FIG. 2 is a simplified electrical schematic representation of a series version of the multiple inductor antenna of the remote access device of the present invention.

Referring now to FIGS. 1 and 2, simplified electrical schematics of the multiple inductor antenna of the remote access device of the present invention are shown. As seen in FIG. 1, three inductors, L1, L2 and L3 may be arranged in a parallel configuration between input/output terminals. Alternatively, as seen in FIG. 2, three inductors, L4, L5 and L6 may be arranged in series between input/output terminals. While not shown, it should be noted that two inductors, rather than three, could be used, and that the inductors could also be wired individually, rather than as part of the same circuit.

Optimization of the pattern of the multiple magnetic fields generated by the remote access device of the present invention can be accomplished through the orientation of the inductor coils with respect to each other. In that regard, perspective views of two embodiments of the remote access device of the present invention are shown in FIGS. 3 and 4.

Figure 3:
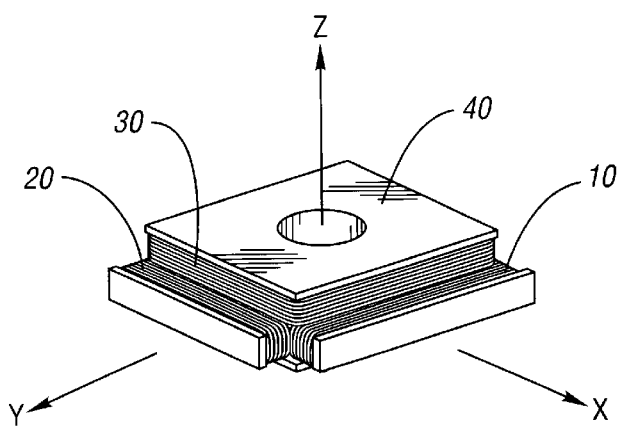
FIG. 3 is a perspective view of one embodiment of the remote access device of the present invention having multiple inductors wound on a single form.
Figure 4:
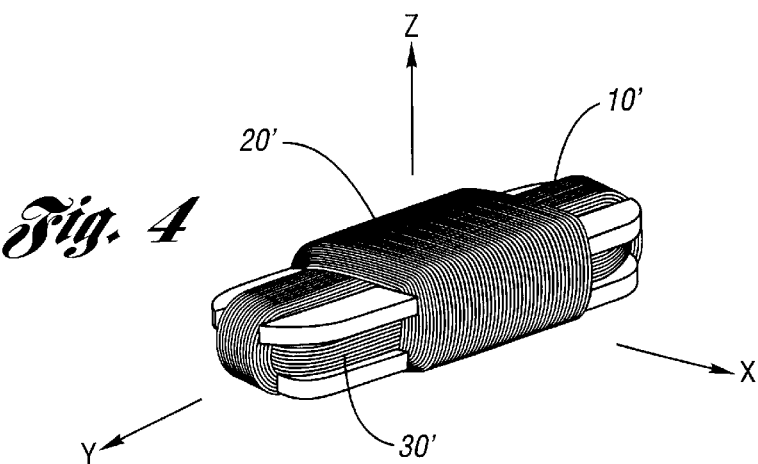
FIG. 4 is a perspective view of another embodiment of the remote access device of the present invention.

As seen in FIG. 3, first, second and third coils (10, 20, 30) are wound about axes that are preferably oriented substantially perpendicular to each other. That is, a first coil (10) is oriented about axis X, a second coil (20) is oriented about axis Y, and a third coil (30) is oriented about axis Z. An alternative embodiment is shown in FIG. 4, where a first coil (10') is oriented about axis X, a second coil (20') is oriented about axis Y, and a third coil (30') is oriented about axis Z. In this embodiment, the windings of the coils (10', 20', 30') overlap.

Referring again to FIG. 3, such a placement of coils (10, 20, 30) along X, Y and Z axes provides for transmission and/or reception of multiple magnetic fields optimized in more than one plane, specifically the X-Y, X-Z and YZ planes. As noted above in connection with FIGS. 1 and 2, coils (10, 20, 30) may be connected in parallel or in series in the same circuit, or may be part of separate circuits.

Additionally, coils (10, 20, 30) could also be configured to operate simultaneously or independently. For example, in a remote access device capable of transmitting and receiving signals, to save battery power, a single coil could initially be used to transmit a signal operative to perform a particular operation. However, if the remote access device does not subsequently receive a return confirmation signal, one or both remaining coils could then also be used to transmit the signal. Finally, while the use of three coils oriented substantially perpendicular to each other along X, Y and Z axes provides for the most optimal and cost efficient transmission and/or reception of multiple magnetic fields, any number of multiple coils in various other orientations could also be employed.

Still referring to FIG. 3, in the preferred embodiment of the present invention, a single form (40) is used on which each of the coils (10, 20, 30) is wound. It should be noted, however, that multiple forms could also be used. Such a form (40), or multiple forms, may be overmolded as an integral piece into the housing (not shown) of the device, such as an RKE fob. It should be noted that coils (10, 20, 30) may be of any size, and may be the same size relative to each other, or of different sizes such that some are more dominant than others. In that regard, coils (10, 20, 30) are preferably small enough for use in a customary handheld RKE fob.

It should also be noted that any suitable core material may be used for coils (10, 20, 30) including, for example, air, ferrite, or aluminum. In the preferred embodiment, air cores are used for all three coils (10, 20, 30). Alternatively, one coil (30) could be a larger, air core inductor, while the other two coils (10, 20) could be ferrite core inductors so that they could be made smaller. The inductance values of multiple coils (10, 20, 30) can be more easily manipulated in order to maintain space and circuit Q requirements.

From the foregoing description, it can be seen that the present invention provides an improved remote access device, such as an RKE fob for use with an automotive vehicle, a remote transmitter or transceiver for use in a tire pressure monitoring system, a remote transmitter for use in a garage door operating system, or a remote transceiver for use in a vehicle immobilizer system. More specifically, the present invention provides a remote access device for low-frequency magnetic field transmission and/or reception in more than a single plane.

In that regard, the remote access device of the present invention preferably includes an inductive coil antenna having two or three inductors oriented in multiple directions, such as along X and Y axes, or X, Y and Z axes, in order to optimize magnetic field transmission and/or reception in multiple planes. The remote access device of the present invention thereby provides improved operation with respect to the previously described orientation and/or distance problems associated with currently available RKE fobs.

Once again, it should also be noted that the remote access device of the present invention can be used for any type of remote access, such as the active or passive remote keyless entry systems of the types described above, which may include an RKE fob or card. Other remote access systems in which the present invention can be used also include entry gate or garage door operating systems where remote access may be required to an entry gate or garage door actuator from a remote transmitter device, tire pressure monitoring systems where remote access may be required to a controller for displaying tire pressure information from a remote transmitter located in a vehicle tire, or any other type of remote access device.

While various embodiments of the remote access device of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention. Indeed, many alternatives, modifications, and variations will be apparent to those skilled in the art in light of the foregoing description, and the remote access device of the present invention is intended to embrace all such alternatives.

What is claimed is:

1. A remote access device for use with an automotive vehicle, the remote access device comprising:
    an antenna including a first inductor having a first axis, a second inductor having a second axis, and a third inductor having a third axis, wherein the first axis is non-parallel to the second axis such that the first inductor generates a first magnetic field associated with a first plane and the second inductor generates a second magnetic field associated with a second plane different than the first plane, and the third axis is non-parallel to the first and second axes such that the third inductor generates a third magnetic field associated with a third plane different than the first and second planes;
    a battery for use in powering the antenna; and
    a housing for the antenna;
    wherein, to conserve battery power, the antenna is configured such that the first, second and third inductors can generate the first, second and third magnetic fields independently in combinations including one or more of the first, second and third magnetic fields.

2. The remote access device of claim 1 wherein the first axis is substantially perpendicular to the second axis.

3. The remote access device of claim 2 further comprising a form for both the first and second inductors, wherein the first and second inductors are both wound on the form.

4. The remote access device of claim 3 wherein the form is overmolded into the housing.

5. The remote access device of claim 3 wherein the first and second inductors each have a core composed of material selected from the group consisting of air, ferrite and aluminum.

6. The remote access device of claim 1 for use in an active remote keyless entry system for a vehicle.

7. The remote access device of claim 1 for use in a passive remote keyless entry system for a vehicle.

8. The remote access device of claim 1 for use in a tire pressure monitoring system for a vehicle.

9. The remote access device of claim 1 for use in a vehicle immobilizer system.

10. The remote access device of claim 1 for use in a garage door operating system.

11. The remote access device of claim 1 wherein the first, second and third axes are substantially perpendicular to each other, respectively.

12. The remote access device of claim 11 further comprising a form for the first, second and third inductors, wherein the first, second and third inductors are each wound on the form.

13. The remote access device of claim 12 wherein the form is overmolded into the housing.

14. The remote access device of claim 12 wherein the first, second and third inductors each have a core composed of material selected from the group consisting of air, ferrite and aluminum.

15. The remote access device of claim 1 further comprising a single form for both the first and second inductors, wherein the first and second inductors are both wound on the form.

16. The remote access device of claim 15 wherein the form is overmolded into the housing.

17. The remote access device of claim 1 further comprising a form for the first, second and third inductors, wherein the first, second and third inductor are each wound on the form.

18. The remote access device of claim 17 wherein the form is overmolded into the housing.

19. The remote access device of claim 1 wherein the first, second and third inductors are electrically connected in parallel.

20. The remote access device of claim 1 wherein the first, second and third inductors are electrically connected in series.

21. A remote transmitter for use with an automotive vehicle, the remote transmitter comprising:

an antenna including a first inductor having a first axis, a second inductor having a second axis, and a third inductor having a third axis, wherein the first axis is non-parallel to the second axis such that the first inductor generates a first magnetic field associated with a first plane and the second inductor generates a second magnetic field associated with a second plane different than the first plane, and the third axis is non-parallel to the first and second axes such that the third inductor generates a third magnetic field associated with a third plane different than the first and second planes;

a battery for powering the antenna; and a housing for the antenna;

wherein, to conserve battery power, the antenna is configured such that the first, second and third inductors can generate the first, second and third magnetic fields independently in combinations including one or more of the first, second and third magnetic fields.

22. The remote transmitter of claim 21 wherein the first axis is substantially perpendicular to the second axis.

23. The remote transmitter of claim 21 for use in an active remote keyless entry system for a vehicle.

24. The remote transmitter of claim 21 for use in a passive remote keyless entry system for a vehicle.

25. The remote transmitter of claim 21 for use in a tire pressure monitoring system for a vehicle.

26. The remote transmitter of claim 21 for use in a vehicle immobilizer system.

27. The remote transmitter of claim 21 for use in a garage door operating system.

28. The remote transmitter of claim 21 wherein the first, second and third inductors are electrically connected in parallel.

29. The remote transmitter of claim 21 wherein the first, second and third inductors are electrically connected in series.

* * * * *